Dec. 20, 1938.  A. A. JOHNSON  2,141,140

SPLASH GUARD FOR VEHICLE WHEEL FENDERS

Filed May 9, 1935

INVENTOR

Patented Dec. 20, 1938

2,141,140

UNITED STATES PATENT OFFICE 2,141,140

SPLASH GUARD FOR VEHICLE WHEEL FENDERS

Arthur A. Johnson, Bridgeport, Conn., assignor to Casco Products Corporation, Bridgeport, Conn., a corporation of Connecticut Application May 9, 1935, Serial No. 20,557

27 Claims. (Cl. 280—152)

This invention relates to splash guards for vehicle-wheel fenders, and more particularly, to the type adapted to be detachably secured to the lower edges of the rear wheel fenders.

Heretofore it was proposed to provide means in the form of clamping jaws secured to an apron, constituting the main body of the splash guard, and adapted to embrace and grip the bead or other margin on the lower edge of the vehicle-wheel fender. Such means as heretofore proposed have proven quite satisfactory when the fenders are of the usual simple style and construction terminating in a straight horizontal line or symmetrical curve. With fenders of unusual style, where, for instance, the outer edge of the fender is higher than the inner edge, and also wherein the rear edge of the fender sweeps outwardly and forwardly, the splash guards as heretofore provided could not be so mounted as to hang plumb, and therefore tended to detract from the appearance of the car rather than to enhance it.

An object of this invention is to provide a splash guard, the clamping means of which is so disposed that the apron may be made to hang plumb, even though the lower edge of the fender inclines upwardly and outwardly, or is otherwise unusual in construction.

To this end, the present invention provides a splash guard and mounting means therefor in which—(1) the mounting means may be adjusted horizontally relative to the fender and the splash guard; (2) the mounting means may be adjusted vertically with reference to the apron; and (3) the mounting means may be adjusted rotatably so as to set squarely on the lower edge of the fender, even though that edge is not horizontal. Usually, the mounting means comprises a pair of clamps, one located at each side of the splash guard.

To accomplish the result of this invention, that is to say, to provide for the adjustment of the apron relative to the fender and the clamps relative to the apron, it is not always essential that both clamps be made adjustable, but it is sufficient that provision be made for adjusting one clamp vertically and horizontally, and it should be understood that such an arrangement is within the scope of this invention.

However, by having both the clamps adjustable vertically relative to the apron, the apron may be raised or lowered bodily to increase or decrease the distance between its lower edge and the ground. Likewise, by having both clamps adjustable laterally, the clamps may be moved nearer together or farther apart, and the apron may be shifted laterally in one direction or the other.

One of the important structural features of the present invention which should be particularly noted is the provision of a transversely extending channel in the apron, which is usually of molded rubber, and in which shoes connected to the clamps respectively may slide to accomplish the lateral adjustment of the apron and/or clamps.

Preferably, this channel is reenforced and stiffened by means of a metallic insert molded in the rubber adjacent the channel so that frictional engagement is produced between the walls of the channel and the shoe to hold the shoe and the clamp to which it is connected against movement casually.

Another structural feature which should be particularly noted is the provision of a single means for holding each clamp in the position to which it is adjusted both vertically and rotatingly, and, further, that when the clamps are made of relatively movable jaws, the same single means may be employed to draw the jaws together and hold them in the position to which they are adjusted vertically and horizontally.

Other features and advantages will hereinafter appear.

In the accompanying drawing—

Figures 1, 2, 3, 4:
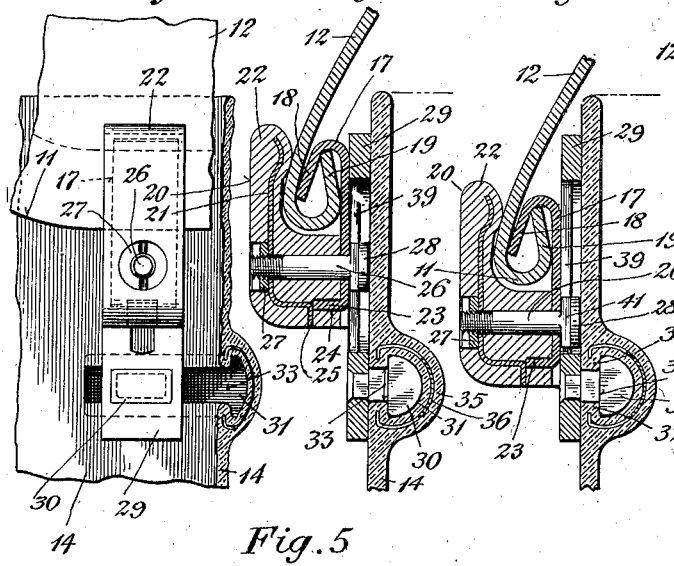
Figure 1 is a view of the rear of a fragment of the fender showing a fragment of the apron and in rear elevation one of the clamping means provided by the present invention for clamping the apron to the fender.
Fig. 2 is a sectional view of the parts shown in Fig. 1.
Fig. 3 is a view similar to Fig. 2, but showing the clamp and apron adjusted vertically relative to each other.
Fig. 4 is a front elevation, showing the clamp fastened to the underside of the fender, and showing the apron in dot-and-dash lines.

As above stated, the subject of the present invention is a splash guard adapted to be secured to the lower edge 11 of a fender 12 for a vehicle-wheel 13. As shown, the splash guard includes an apron 14 which may be of any suitable material but is preferably made of molded rubber, and this is adapted to be supported on the lower edge 11 of the fender by clamps 15 so as to form an extension of the fender and prevent mud and water thrown off by the wheel 13 from being splashed or blown against the rear of the vehicle or upon a vehicle which may be following.

Figure 5:
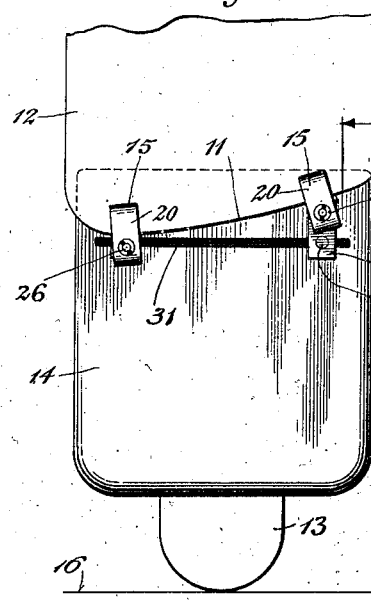
Fig. 5 is a rear view of the fender and wheel of an automobile, showing the splash guard of the present invention applied thereto.
Figure 6:
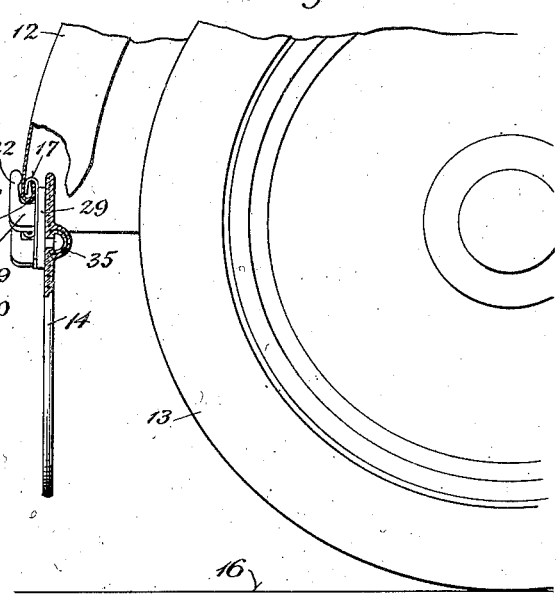
Fig. 6 is a side view of the parts shown in Fig. 5, but with a portion of the fender and apron broken away to show the way in which the clamp engages the fender.

When the lower edge 11 of the fender is parallel with the ground indicated by the line 16, Figs. 5 and 6, or when it is curved but substantially symmetrical, the apron 14 will hang substantially plumb when the clamps 15 are mounted in fixed positions on the apron.

When, however, the lower edge 11 of the fender 12 is irregular or, as shown in Fig. 5, inclines upwardly and outwardly, the aprons having the clamps mounted in fixed positions do not hang plumb but skew toward one side or the other, with the result that they detract from the appearance of the car rather than enhance it. Moreover, when the apron hangs out of plumb, the pressure of the air against it when the car is in motion causes it to twist sidewise, with the result that mud and water arrested by the apron is blown from the side edge and against the rear bumper, etc., and thus the desired result is not obtained.

Besides, when the clamps 15 are located in fixed positions on the apron, the splash guard attached to one car may have the lower edge of the apron located too close to the ground because the edge 11 of the fender is lower than usual, or it may be spaced too far from the ground to be fully effective because the edge of the fender is higher than usual.

To obviate these difficulties and provide a splash guard which is practically universal in its application to fenders of different style, the present invention, in the embodiment thereof and illustrated herein, provides for adjusting the clamps 15 vertically relative to the apron and to each other, horizontally relative to the apron, each other and the fender, and pivotally relative to the apron, the fender and each other. Moreover, these adjustments are so provided that they may be made simultaneously. That is to say, the clamps 15 may be adjusted vertically from any horizontal position on the apron, and they may be adjusted rotatably in any vertically or horizontally adjusted position.

According to the present invention in its broader aspects, the clamps 15 may have any suitable or desirable construction. As shown, each clamp 15 comprises a sheet metal piece 17 forming a jaw and preferably having a hook 18 adapted to engage the rear lower portion of the fender, hooking in behind the upturned portion of a bead 19 on the lower edge 11 of the fender 12. Cooperating with this jaw 17 is another jaw 20 which, as shown, comprises a sheet metal piece 21 around which is molded suitable non-marring material such as rubber 22. The jaw 17 has a lug 23 entering an aperture 24 in the rubber block 22 and abutting against a lug 25 on the sheet metal piece 21, so that the jaws fulcrum on each other and are capable of movement toward and from each other to open to receive and close to grip the lower edge 11 of the fender.

The jaws 17 and 20 are drawn together in gripping relation by a bolt 26 extending through apertures in the jaws 17 and 21 respectively and having at its outer end a nut 27.

The head 28 of the bolt is mounted in and supported by a plate 29 having at its lower end a head 30 which is located in a channel 31 extending transversely across the apron 14. The channel 31 is undercut and has overhanging flanges 32 and in the space 33 between the flanges 32 the head 30 is reduced, thereby producing on the head shoulders 34 engaging the flanges and preventing the casual withdrawal of the head from the channel 31.

The head 30 has a sliding fit in the channel 31, and thus each plate 29 may be slid laterally relative to the apron 14. Thus, if desired, after the clamps 15 are attached to the lower edge of the fender, for instance as in Fig. 5, the entire apron may be shifted to one side or the other to centralize the apron relative to the fender 12, and thus if the clamps are so attached to the fender that the apron would be caused to buckle, the apron need merely be pulled to one side or the other so as to hang straight and flat. Moreover, if it is desired to have the clamps 15 spread as far apart as possible, one clamp may be attached to the fender and then the apron and the other clamp pulled to the other side as far as possible before the second clamp is tightened in place.

If it is desired to have the clamps located closer to the center of the apron, they may be slid to that position before the clamps are applied to or tightened upon the fender.

By making the apron 14 flexible, or at least the portion thereof adjacent the channel 31, the apron may be snapped onto the clamps, since, by bending the apron about the rearwardly extending enlargement 35 provided to form the channel 31, the space 33 may be opened sufficiently to permit the head 30 to be forced into the channel 31.

Thus, if desired, the clamps 15 may be removed from the aprons and individually and separately applied to the lower edge of the fender without the apron in any way interfering with this operation and adjustment. After the clamps are secured, the apron may be snapped onto the clamps by forcing the heads 30 into the channel 31.

The material of the apron 14 may be so selected that the head is satisfactorily and resiliently gripped in the channel 31. However, to insure the proper degree of gripping action between the channel and the head, there is preferably inserted in the portion 35 a reenforcing and stiffening bar 36 of springy material. And, in order to avoid the necessity of flexing the entire bar 36 when inserting and removing the head 30, the bar 36 may be divided into a plurality of relatively narrow fingers 37 by slots 38, see Fig. 9. Thus, only the portion of the bar 36 which directly surrounds the head 30 need be flexed when inserting and removing the head from the channel 31.

With this arrangement, wherein the fingers 37 tend to partially close the space 33 and the channel 31, the portions of the material at each side of the head will be pressed inwardly, thereby yieldingly arresting the lateral movement of the head in the channel and avoiding casual or accidental shifting of the apron relative to the plates 29.

To adjust the apron and clamps 15 vertically relative to each other and to the apron 14, each plate 29 is provided with a vertically extending slot 39 in which is located the head 28 of the bolt 26. The margins 40 of the slot 39 are countersunk below the front surface of the plate 29, so that the head 28 of the bolt may be slid up and down in the slot, and to keep the bolt 28 from turning a portion 41 of the head 28 is flattened so as to extend through the slot 39.

To adjust the clamp 15 relative to the apron, the nut 27 is loosened to release the head from its locking engagement with the margins 40 of the slot 38. The apron is then moved up or down as desired, the bolt 26 riding in the slot for this purpose. When the clamp is in desired position, the nut 27 is again tightened. This tightening of the nut 27, it will be seen, draws the head 28 of the bolt against the margin 40 of the plate 29, and, at the same time, draws the two jaws 17 and 20 of the clamp together and against the plate 29, thus holding the clamp against turning as a unit on the bolt 26 and against moving vertically relative to the plate 29.

It will thus be seen that when the lower edge of the fender, as shown in Fig. 5, inclines upwardly and outwardly, the apron 14 may be hung plumb from the lower edge of the fender by, as in the case illustrated in Fig. 5, adjusting the left hand clamp 15 downwardly relative to the apron and the right hand clamp 15 upwardly with relation to the apron.

It will also be seen that in this situation, the clamps 15 are not vertically disposed but follow at right angles to the adjacent lower edge of the fender, and this movement of the clamp relative to the plate 29 takes place about the axis of the bolt 26.

Since the vertical adjustment takes place between the plate 29 and the clamp and since the plate 29 is adjustable horizontally relative to the apron 14, the vertical adjustment of the clamp may be effected in any position horizontally to which the plate 29 is adjusted, and, likewise, the plate 29 may be adjusted horizontally regardless of the vertical position of the jaws 17 and 20 on the plate 29.

It is preferable, as illustrated herein and as above described, to have each of the clamps 15 adjustable both horizontally, vertically and rotatably, but it should be understood that in the broader aspects of this invention it is sufficient to have only one of the clamps adjustable horizontally and only one of the clamps adjustable vertically, and for most practical purposes it is sufficient, and extremely advantageous results are obtained, by having only one of the clamps adjustable both vertically and horizontally.

Figure 7:
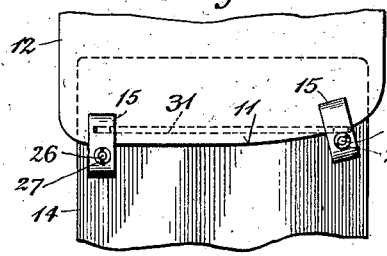
Fig. 7 is a rear view of a portion of the fender and upper portion of the apron, showing the apron adjusted vertically relative to the lower edge of the fender.

However, when both clamps 15 are adjustable vertically, the entire apron 14 may be raised bodily relative to the lower edge of the fender as is illustrated in Fig. 7, where the upper edge of the apron is shown substantially above the lower edge 11 of the fender.

Figure 8:
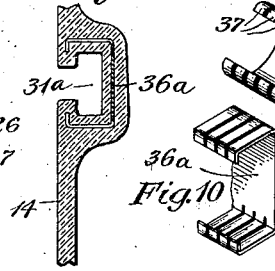
Fig. 8 is a sectional view through a portion of the apron, showing a modification of the channel in the apron shown in Fig. 1.
Figures 9, 10:
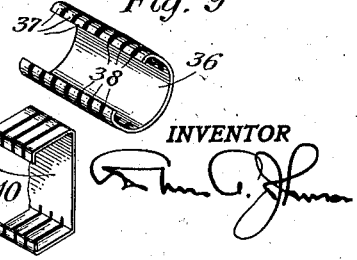
Fig. 9 is a perspective view of the reenforcing and pressure-applying member shown in Figs. 1 to 3.
Fig. 10 is a similar view of the reenforcing and pressure-producing member employed in the modification shown in Fig. 8.

In Figs. 8 and 10, there is shown a modification of the shape of the channel in the apron and the reenforcing and friction-producing bar. As shown in Fig. 8, the channel 31a may be T-shape and the reenforcing bar 36a may be U-shape.

Other variations and modifications may be made within the scope of this invention and portions of the improvements may be used without others.

Having thus described the invention, what is claimed as new and for which it is desired to obtain Letters Patent, is:—

1. An automobile fender splash guard comprising an apron; a pair of attaching clamps each comprising a pair of jaws to embrace and grip the lower edge of a fender and means for securing said jaws together; and means for mounting said jaws and securing means on said apron for vertical movement relative thereto to raise and lower the apron bodily relative to the fender.

2. An automobile fender splash guard comprising an apron; a pair of attaching clamps each comprising a pair of jaws to embrace and grip the lower edge of a fender; and means including a transverse channel in said apron open at one side thereof for mounting said clamps on said apron for horizontal movement relative thereto to shift the apron laterally relative to the fender.

3. An automobile fender splash guard comprising an apron; a pair of attaching clamps, including draft means for the jaws thereof to be secured to the fender; and means for mounting said clamps and draft means on said apron for vertical and horizontal movements relative thereto to raise and lower the apron relative to the fender and to shift the apron laterally with regard to the fender respectively.

4. An automobile fender splash guard comprising an apron; a pair of attaching clamps to be secured to the fender; comprising jaws and means for securing said jaws together for rotary movement relative to the fender; and means for mounting said clamps on said apron for vertical and transverse movements relative thereto.

5. An automobile fender splash guard comprising an apron; a pair of attaching clamps to be secured to the fender; and means including a transverse channel in said apron open at one side thereof for mounting said clamps on said apron for rotary and horizontal movements relative thereto.

6. An automobile fender splash guard comprising an apron; a pair of attaching clamps to be secured to the fender; and means including a transverse channel in said apron open at one side thereof for mounting said clamps on said apron for rotary, vertical and horizontal movements relative thereto.

7. An automobile fender splash guard comprising an apron; a pair of attaching clamps, one at each side of the apron, and each comprising a pair of jaws to embrace and grip the lower edge of the fender and means for securing said jaws together; and means for mounting the securing means of each of said clamps on said apron for independent vertical movement relative to the apron whereby either or both sides of the apron may be raised or lowered relative to the fender.

8. An automobile fender splash guard comprising an apron; a pair of attaching clamps, one at each side of the apron; and means including a transverse channel in said apron open at one side thereof for mounting each of said clamps on said apron for independent horizontal movement relative thereto, whereby the position of each clamp may be varied laterally of the apron.

9. An automobile fender splash guard comprising an apron; a pair of attaching clamps, one at each side of the apron; and means including a transverse channel in said apron open at one side thereof for mounting each of said clamps on said apron for independent vertical and horizontal movements relative to the apron, whereby either or both sides of the apron may be raised or lowered relative to the fender and either of said clamps may be adjusted laterally of the apron.

10. An automobile fender splash guard comprising an apron; a pair of attaching clamps to engage and grip the lower edge of a fender, said clamps comprising jaws and means for securing the jaws together; and means for mounting at least one of said clamps on said apron for sliding vertical movement relative thereto.

11. An automobile fender splash guard comprising an apron; a pair of attaching clamps to engage and grip the lower edge of a fender; and means including a transverse channel in said apron open at one side thereof for mounting at least one of said clamps on said apron for horizontal movement relative thereto.

12. An automobile fender splash guard comprising an apron; a pair of attaching clamps to engage and grip the lower edge of a fender; and means including a transverse channel in said apron open at one side thereof for mounting at least one of said clamps on said apron for vertical and horizontal movements relative thereto.

13. An automobile fender splash guard comprising an apron; a pair of attaching clamps to engage and grip the lower edge of a fender, said clamps comprising jaws and means for securing the jaws together; and means for mounting at least one of said clamps on said apron for vertical movements relative to the apron and for rotary movement relative to the apron about a substantially horizontal axis substantially perpendicular to the flat of the apron.

14. An automobile fender splash guard comprising an apron; a pair of attaching clamps to engage and grip the lower edge of a fender; and means including a transverse channel in said apron open at one side thereof for mounting at least one of said clamps on said apron for rotary and horizontal movements relative thereto.

15. An automobile fender splash guard comprising an apron; a pair of attaching clamps to engage and grip the lower edge of a fender; and means including a transverse channel in said apron open at one side thereof for mounting at least one of said clamps on said apron for rotary, vertical and horizontal movements relative thereto.

16. An automobile fender splash guard comprising an apron having a transverse slot; means mounted in said slot and including a vertically disposed plate having an elongated T slot therein; a clamp comprising a pair of relatively movable jaws to embrace and grip the lower edge of a fender; a bolt having a head riding in said T slot and extending through said jaws, said bolt rotatably supporting said clamp; and a threaded draught member associated with said bolt for drawing said clamping jaws together and against the lower edge of the fender and securing said clamp to said plate in the position to which it is rotatably and vertically adjusted.

17. An automobile fender splash guard comprising an apron; a transverse channel in said apron open at one side thereof; a plate having a shoe confined in said channel and slidable relative thereto; and means carried by said plate for clamping the apron to the lower edge of a fender.

18. An automobile fender splash guard comprising an apron; a pair of attaching clamps to be secured to the fender; and a snap demountable connection between the clamps and the apron to secure the apron to the clamps with the clamps in service-grip engagement with the fender.

19. An automobile fender splash guard comprising an apron; a pair of attaching clamps each comprising a pair of jaws to embrace and grip the lower edge of a fender and a guide plate connected to the apron; means for mounting each pair of jaws on the guide plate for vertical and rotary movements relative thereto to adjust the clamp with relation to the apron and fender; and a single means for securing each pair of jaws on said guide plate in adjusted vertical and rotary positions.

20. An automobile fender splash guard comprising an apron; a pair of attaching clamps each comprising a pair of jaws to embrace and grip the lower edge of a fender and a guide plate connected to the apron; means for mounting each pair of jaws on the guide plate for vertical and rotary movements relative thereto to adjust the clamp with relation to the apron and fender; and a single means for drawing said each pair of jaws together to clamp the same upon the edge of the fender and to secure the same to the guide plate in the position to which it is adjusted by said vertical and rotary movements.

21. An automobile fender splash guard comprising an apron; a pair of attaching clamps to be secured to the fender; and means including a transverse channel in said apron open at one side thereof for mounting said clamps on said apron for vertical and horizontal movement relative thereto to raise the apron relative to the fender and to shift the apron laterally with regard to the fender respectively.

22. An automobile fender splash guard comprising an apron; a pair of attaching clamps including draft means for the jaws thereof, one of said clamps being disposed at each side of the apron; and means for mounting each of said clamps on said apron for independent vertical and horizontal movements relative to the apron, whereby either or both sides of the apron may be raised or lowered relative to the fender and either of said clamps may be adjusted laterally of the apron.

23. An automobile fender splash guard comprising an apron; a pair of attaching clamps to be secured to the fender; and means including a transverse channel in said apron open at one side thereof for mounting said clamps on said apron for vertical and horizontal movement relative thereto whereby the apron may be adjusted vertically when in any adjusted horizontal position.

24. An automobile fender splash guard comprising an apron; a pair of attaching clamps to be secured to the fender; and means including a transverse channel in said apron open at one side thereof for mounting said clamps on said apron for vertical and horizontal movement relative thereto whereby the apron may be adjusted horizontally when in any adjusted vertical position.

25. An automobile fender splash guard comprising an apron; a pair of attaching clamps to be secured to the fender; and a snap demountable connection between the clamps and the apron to secure the apron to the clamps, said snap connection being below the zone of engagement of the clamps with the fender.

26. An automobile fender splash guard comprising an apron; a pair of attaching clamps to be secured to the fender; and a snap demountable connection between the clamps and the apron to secure the apron to the clamps, said snap connection including a resilient-walled keeper means carried by the apron, said keeper means being distortable to abnormal condition, and projections carried by the clamps enterable into said keeper means when thus distorted.

27. An automobile fender splash guard comprising an apron of flexible material; a plate having a face secured in engagement with a face of the apron adjacent the upper marginal portion of said apron; means for attaching the apron to a support including draft means whereby the attaching means can be drawn into clamping relation with a support; and means located on the same side of the apron as the plate and associated with said plate and attaching means for interconnecting the same so that the apron may be pendantly disposed from the point of engagement between the attaching means and the support, said interconnecting means including a pin and elongate slot connection whereby angular and vertical adjustment of the apron with respect to the attaching means is attained.

ARTHUR A. JOHNSON.